Aug. 29, 1967  R. T. ACKROYD ET AL  3,338,790
FAST NUCLEAR REACTOR

Original Filed Sept. 14, 1964

United States Patent Office 3,338,790
Patented Aug. 29, 1967

3,338,790
FAST NUCLEAR REACTOR
Ronald Tunstall Ackroyd, Upton-by-Chester, Reginald Martin Lord, Culcheth, and John Erskine Mann, Liverpool, England, assignors to United Kingdom Atomic Energy Authority, London, England
Continuation of application Ser. No. 396,193, Sept. 14, 1964. This application Oct. 3, 1966, Ser. No. 584,006
Claims priority, application Great Britain, Sept. 26, 1963, 38,048/63
6 Claims. (Cl. 176—18)

This application is a continuation of our co-pending application Serial No. 396,193 filed Sept. 14, 1964.

The present invention relates to heterogeneous fast nuclear reactors. A fast reactor has a fast fuel region which implies the absence of any significant amount of neutron moderator and therefore the ability to sustain a fission chain reaction with a high energy neutron flux; it is generally recognised that the average of the flux energy spectrum will exceed 1 kev. in the fast fuel region.

It is to be undertsood that a reactor as previously identified has its fuel contained in fuel elements which are grouped together with a lattice spacing so that between them can pass a flow of coolant for abstracting the heat generated in operation. Even with a highly efficient coolant such as liquid sodium it is usual for the coolant to represent a volume fraction of the fast fuel region of around one third. Thus, although it is most unlikely that the fuel elements would ever become so starved of coolant that they overheat to the point of melting, the consequence should nevertheless be considered because in the absence of coolant it becomes possible for the fast fuel to collapse in the molten state into a volume which may be only two thirds of the volume of the original region. Since the fissile content of the fuel has to be so high in order to meet the fast fission capability a serious criticality hazard can therefore arise. Measures to reduce such a hazard are therefore desirable.

According to the present invention, in a heterogeneous fast nuclear reactor, a fast fuel region presenting a radial periphery and two axial peripheries has over substantially the full extent of at least one such periphery a zone of separation from a region having a higher proportion of fertile to fissile material which zone has a greater coolant volume fraction than either of the aforesaid regions and a thickness exceeding the neutron mean free path in the coolant for the neutron energy spectrum prevailing in the fast fuel region during normal operation. In typical fast flux spectrums, the mean free path in a sodium coolant is about 10 cms. while that for supercritically pressurised aqueous coolant (which is another possible fast reactor coolant) is about 1¼ cm. at a density of 0.8 gm./cc.

The separating zone in effect constitutes a gap between the two regions which in normal operation is filled with the coolant; preferably the gap is free of fertile and fissile material and has a coolant volume fraction approximating to unity. This coolant-filled gap, together with the more fertile region, acts as a reflector for neutrons in normal operation, but, on loss of coolant, neutron leakage will be increased by direct escape at the gap extremities and by misdirected reflection.

This increase of neutron leakage, and the possibility which it offers of ensuring no gain of reactivity on loss of coolant, is of interest particularly where the coolant is a supercritically pressurised aqueous medium. With such a coolant there is a marked tendency in fast reactors, especially large systems where leakage in normal operation is less significant, towards a reactivity gain on loss of coolant. Bearing in mind that the reactor core will generally raise the coolant temperature well above the critical temperature of 374° C. and that above this temperature the density of supercritical steam diminishes rapidly, it is preferred that the coolant passing through the separating zone or coolant gap remains at subcritical temperature to enhance the magnitude of leakage control. It is convenient to provide for the separating zone a separate flowpath through which a portion of the coolant feed is diverted; this portion is preferably reunited with the flow through the fast fuel region, that is to say, the flowpath is in series or in parallel with the flow through the fast fuel region.

Examples of the invention are illustrated in the accompanying diagrammatic drawings in which.

Figure 1:
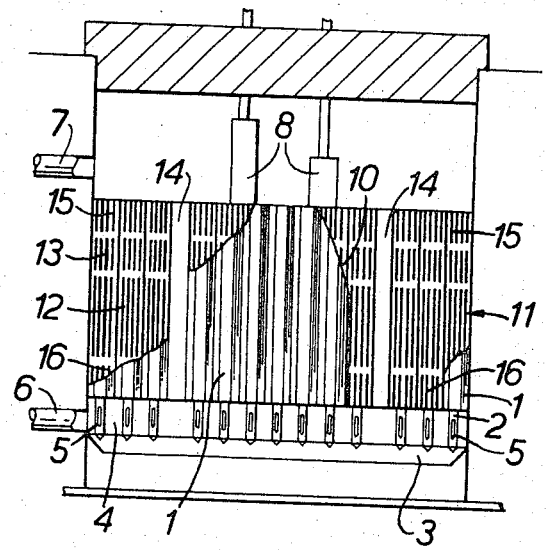
FIGURES 1 and 2 are sodium-cooled fast reactors.

By way of explanation of the general manner of construction of these reactors, the core is composed in each case of close-packed fuel assemblies; these assemblies have an elongated hexagonal casing or wrapper 1 in which pins of sheathed fissile or fertile material, as the case may be, are supported in parallel relationship according to a lattice pattern. The casings are open at their upper ends, and at their lower ends are extended by hollow cylindrical spikes 2 which fit into a grid support structure 3; in this structure is a coolant inlet plenum 4 with which the interiors of the fuel assembly casings communicate through elongated slots 5 in the spikes 2. Coolant supplied to the plenum 4 through an inlet duct 6 therefore flows up through the assemblies, and hence over the pins supported therein, to an outlet duct 7. Reactivity control elements are indicated at 8: they are conveniently similar to the assemblies previously described but with the pins filled with a neutron absorber. Pins of like content are grouped together by the assemblies into various regions of differing composition and it is by reference to these regions that the several examples will now be described in greater detail.

In FIG. 1, a fast fuel region, which is right cylindrical, is indicated 10, and a more fertile region, designated generally 11, surrounding it is composed of a radial breeder blanket 12 and a collar 13. This collar has a fertile to fissile ratio intermediate the ratio of the fast fuel region and the remainder of the more fertile region, and constitutes a sub-region which, in the direction of the vertical axis, is co-extensive with, or within, a top length of the fast fuel region equal to $\alpha L$, where $\alpha$ is the coolant volume fraction of the fast fuel region and $L$ is the overall length of the fast fuel region. The reactor relies for criticality on fission in the collar sub-region and therefore a negative reactivity effect is obtained in the event that the fast fuel region becomes uncoupled from the sub-region. Due to the previously specified disposition of the sub-region relative to the fast fuel region, uncoupling will occur as the latter suffers collapse by downward compaction. The uncoupling will be complete at least by the time the fast fuel region is fully compacted. It is a reasonable assumption that the sub-region will not suffer collapse in these circumstances because its thermal rating will be much less than that of the fast fuel region on account of the relatively lower fissile content.

In the present example, the coolant volume fraction of the fast fuel region is assumed to be one-third and therefore the collar 13 is co-extensive with a top third of the fast fuel region.

Between the fast fuel region and the surrounding region is an annular coolant-filled gap 14. For the purposes of this example the thickness of the gap is 4 inches between the fast fuel region and the radial blanket; it may be somewhat less between the fast fuel region and the collar. Top and bottom axial breeder blankets 15 and 16 respectively are also penetrated by the gap and here the thickness can be even less still. Although the coolant is liquid sodium, it could be alternatively a low melting point sodium base alloy, such as NaK.

The collar 13 may be adapted for operation as a thermal fission sub-region in which case moderator material for thermalising the neutrons would be included in the pins of this sub-region. If the flow of coolant through the core is upwards, it may be desirable to include in the peripheral region a second collar, similar to collar 13 but co-extensive with the equivalent bottom length of the fast fuel region. Such a measure would achieve uncoupling if compaction of the fast fuel took place upwardly.

In typical cases, 1 to 2% of reactivity may be held in the collar while still retaining a suitably low fissile rating in the collar. The addition of the coolant annulus by means of the gap 14 can increase the loss of reactivity on loss of the sodium by about 3%.

By suitable choice of core parameters the sodium loss and decoupling effects can be made to exceed the reactivity gain on collapse. In a specific case having a collar, a length to diameter ratio for the core of 0.67, and a coolant fraction of one-third in the fast fuel region, the core is just supercritical on collapse and loss of sodium but by the addition of the sodium annulus can be expected to have a substantial net negative reactivity.

In combination, the separating zone and the collar sub-region enable an overall negative reactivity change, in the event of coolant starvation and consequent melting in the fast fuel region, to be predicted for a wide range of reactor core geometries. Thus, in particular, for the case of vertically orientated right cylindrical fast fuel regions, the ratio of vertical length to diameter can have values above 0.5 without large concentration of the fissile investment in the collar sub-region. Hitherto, values of this ratio less than 0.5 have been considered for obtaining the objective in question but with a construction of the fast fuel region using pins a low ratio implies an increasing number of pins and therefore greater expense.

Figure 2:
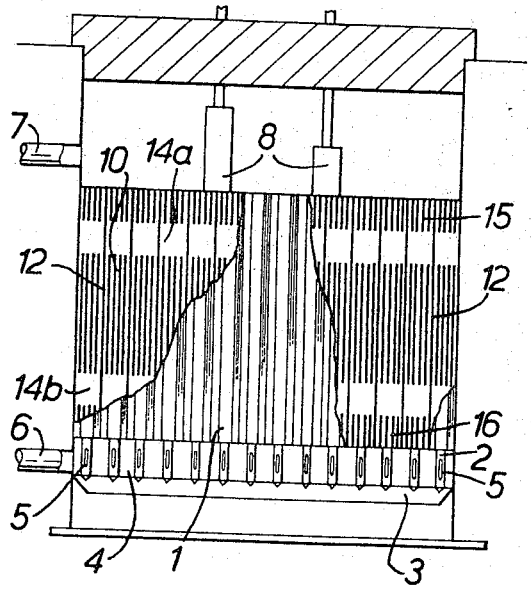

Where, as in FIG. 2, a separating zone is provided at an axial periphery, it is preferably extended through the more fertile material at the radial periphery just as the separating zone at the radial periphery is extended through the more fertile material at the axial peripheries.

More specifically, FIGURE 2 is a modification of FIG. 1 to the extent that the collar is omitted and the coolant-filled gap occurs at 14a and 14b between the fast fuel region 10 and the top and bottom axial breeder blankets 15 and 16, that is to say, over the axial peripheries of the fast fuel region.

Figure 3:
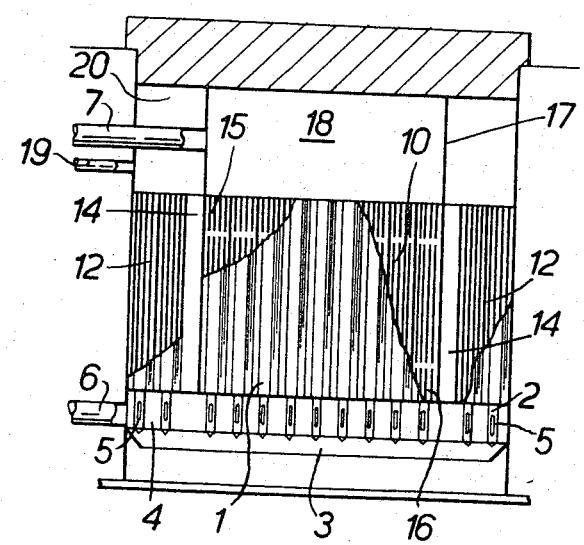
FIGURE 3 is a fast reactor cooled by supercritically pressurised aqueous coolant.

In FIG. 3, where the reactor is cooled by a supercritically pressurised aqueous coolant, the collar is again omitted although otherwise the arrangement of the regions 10, 12, 15 and 16, and the coolant gap 14, is similar to FIG. 1. Here, however, it is important that the coolant in the gap remains at a subcritical temperature and for this purpose a coolant flowpath including the coolant gap is arranged in series with but preceding the flow-path through the fast fuel region. As illustrated such arrangement is obtained by means of a skirt 17 defining a hot box 18 above the assemblies 1 containing the pins of the fast fuel region, the outlet duct 7 being open to this hot box while an auxiliary inlet duct 19 opens into an annular header 20 formed around the skirt. Into this header is pumped a portion of the coolant feed which therefore makes a pass downwards through the coolant gap and the radial breeder blanket in parallel to rejoin the main coolant stream in the inlet plenum 4.

In the event that the inlet temperature of the main coolant stream exceeds the critical temperature, the coolant portion diverted to the auxiliary inlet duct 19 must be passed through a supplementary cooler beforehand. However, in all likelihood the best use of the type of reactor in question is on a direct cycle whereby the hot outlet coolant is fed directly as the working fluid into a prime mover system. Such a cycle makes available from intermediate the feed pump and the feed heaters a supply of pressurised coolant which is at a relatively low temperature, typically low enough for the coolant density to be as much as 0.95 gm./cc. Preferably, therefore, it is this supply which is tapped for passage through the coolant gap and radial breeder.

The coolant gap is 1½ inches thick and with this thickness it has been established that a negative change of reactivity is obtainable on loss of coolant even in the circumstances where an epithermal neutron absorber, such as hafnium, is included with the fuel in the fast fuel region to counteract reactivity gain in the event of "flooding," that is to say, increase of the coolant density to the maximum of 1 gm./cc. Furthermore such thickness still allows of a breeding gain.

What we claim is:

1. A heterogeneous fast nuclear reactor having a reactor core cooled by a fluid coolant which core comprises a fast fuel region presenting a radial periphery and two axial peripheries, a blanket region surrounding the fast fuel region at least to the extent of encircling the radial periphery and having a proportion of fertile to fissile material higher than in the fast fuel region, and a zone extending substantially uninterruptedly adjacent to and co-extensively with an interface formed between the two regions at one of said peripheries, said zone having a greater coolant volume fraction than either of the regions and a thickness exceeding the neutron mean free path in coolant for the neutron energy spectrum prevailing in the fast fuel region during normal operation.

2. A heterogeneous fast nuclear reactor according to claim 1 wherein the said zone is free of fertile and fissile material and has a coolant volume fraction approximating unity.

3. A heterogeneous fast nuclear reactor having a core cooled by a low melting point metallic coolant at least predominantly of sodium which core comprises a fast fuel region presenting a radial periphery and two axial peripheries, and a blanket region surrounding the fast fuel region at least to the extent of encircling the radial periphery and having a proportion of fertile to fissile material higher than in the fast fuel region, and a zone extending substantially uninterruptedly adjacent to and co-extensively with an interface formed between the two regions at one of said peripheries, said zone having a greater coolant volume fraction than either of the regions and a thickness exceeding 10 cm.

4. A fast nuclear reactor according to claim 3 wherein the fast fuel region is orientated on a vertical axis and wherein the blanket region includes a sub-region having a fertile to fissile ratio intermediate between those of the fast fuel region and the remainder of the blanket region, the length of the sub-region in the direction of the vertical axis being co-extensive with a top length of the fast fuel region equal to $\alpha L$ (where $\alpha$ is the coolant volume fraction of the fast fuel region and $L$ is the overall length of the fast fuel region).

5. A heterogeneous fast nuclear reactor having a core cooled by a supercritically pressurized aqueous coolant which core comprises a fast fuel region presenting a radial periphery, a blanket region surrounding substantially the entire extent of the radial periphery and having a proportion of fertile to fissile material higher than in the fast fuel region, a zone extending substantially uninterruptedly adjacent to and co-extensively with the interface formed between the two regions at the radial periphery, said zone being of fertile material and having a greater coolant volume fraction than either of the regions and a thickness exceeding 1¼ cm., means separating from coolant flow through the fast fuel region a coolant flowpath including the said zone, and means for supplying coolant at subcritical temperature to said flowpath.

6. A heterogeneous fast nuclear reactor according to claim 5 wherein said flowpath has an inlet to receive a portion of the coolant feed and an outlet to rejoin said portion with the coolant flow through the fast fuel region.

No references cited.

REUBEN EPSTEIN, *Primary Examiner.*